(12) United States Patent
Green

(10) Patent No.: US 6,920,207 B2
(45) Date of Patent: Jul. 19, 2005

(54) TECHNIQUES TO RECONNECT WITH A MODEM

(75) Inventor: Jeffrey A. Green, Wake Forest, NC (US)

(73) Assignee: Intel Corporation, Santa Clara, CA (US)

( * ) Notice: Subject to any disclaimer, the term of this patent is extended or adjusted under 35 U.S.C. 154(b) by 386 days.

(21) Appl. No.: 10/146,990

(22) Filed: May 15, 2002

(65) Prior Publication Data

US 2003/0215071 A1 Nov. 20, 2003

(51) Int. Cl.7 ............................................. H04M 11/00
(52) U.S. Cl. ........................................................ 379/93.35
(58) Field of Search .................... 379/93.35, 93.09, 379/93.11, 93.15, 93.28, 93.31, 215.01

(56) References Cited

U.S. PATENT DOCUMENTS

| | | | | |
|---|---|---|---|---|
| 4,852,151 A | * | 7/1989 | Dittakavi et al. | 379/93.35 |
| 4,995,074 A | * | 2/1991 | Goldman et al. | 379/93.35 |
| 6,104,800 A | * | 8/2000 | Benson | 379/93.35 |
| 6,118,857 A | * | 9/2000 | Terschluse | 379/93.35 |
| 6,317,488 B1 | * | 11/2001 | DePond et al. | 379/93.35 |
| 6,345,088 B1 | * | 2/2002 | Gu et al. | 379/93.35 |
| 6,690,776 B1 | * | 2/2004 | Raasch | 379/93.35 |
| 6,731,726 B1 | * | 5/2004 | Kerner et al. | 379/93.35 |

FOREIGN PATENT DOCUMENTS

EP 0741481 A2 * 6/1996 .......... H04M/11/06

OTHER PUBLICATIONS

Telecommunication Standarization Sector of Itu, "Series V: Data Communication Over the Telephone Network" Enhancement to Recommendation V.90, V–92 (11/200).

* cited by examiner

Primary Examiner—Stella Woo
(74) Attorney, Agent, or Firm—Glen B. Choi

(57) ABSTRACT

Techniques to ensure reconnection between a modem and a server modem on hold. A first communication path between a modem and a sever modem may be interrupted to open a second communication path between a telephone and a third party terminal. When the second communication path is terminated, the techniques ensure reconnection to the first communication path by requesting the central office to cycle among paths until a server modem that is ready to reconnect is detected.

27 Claims, 5 Drawing Sheets

TECHNIQUES TO RECONNECT WITH A MODEM

FIELD

The subject matter disclosed herein generally relates to communications systems and more particularly to techniques to establish connections among devices in communications systems.

DESCRIPTION OF RELATED ART

Recommendations ITU-T V.90 (1998) ("V.90") and ITU-T V.92 (November 2000) ("V.92") are well known standards that describe one possible manner in which a modem (e.g., a modem coupled to a personal computer) communicates with a server modem (e.g., a modem provided by an internet service provider ("ISP")) using a telephone line. V.92 permits a modem with a first communications path to a server modem to put the server modem on hold (so called "modem on hold") and allow a user who subscribes to call waiting to utilize a second communications path provided during call waiting to engage a third party.

BRIEF DESCRIPTION OF THE DRAWINGS

Note that use of the same reference numbers in different figures indicates the same or like elements.

DETAILED DESCRIPTION

In accordance with an embodiment of the present invention, techniques are provided to reestablish a first communications path between first and second modems after a second communications path between the first modem and a third party terminal has terminated. In one embodiment, following termination of the first communications path, if an indication that the second modem is available is not detected, then the first modem requests a central office to provide a different communications path. For each communications path, the first modem monitors for an indication that the second modem is available. If an indication is detected, the first and second modems reconnect using the path on which the indication was detected. These and other features and advantages of the present invention will become more apparent from the following detailed description taken together with the accompanying drawings.

Figure 1A:
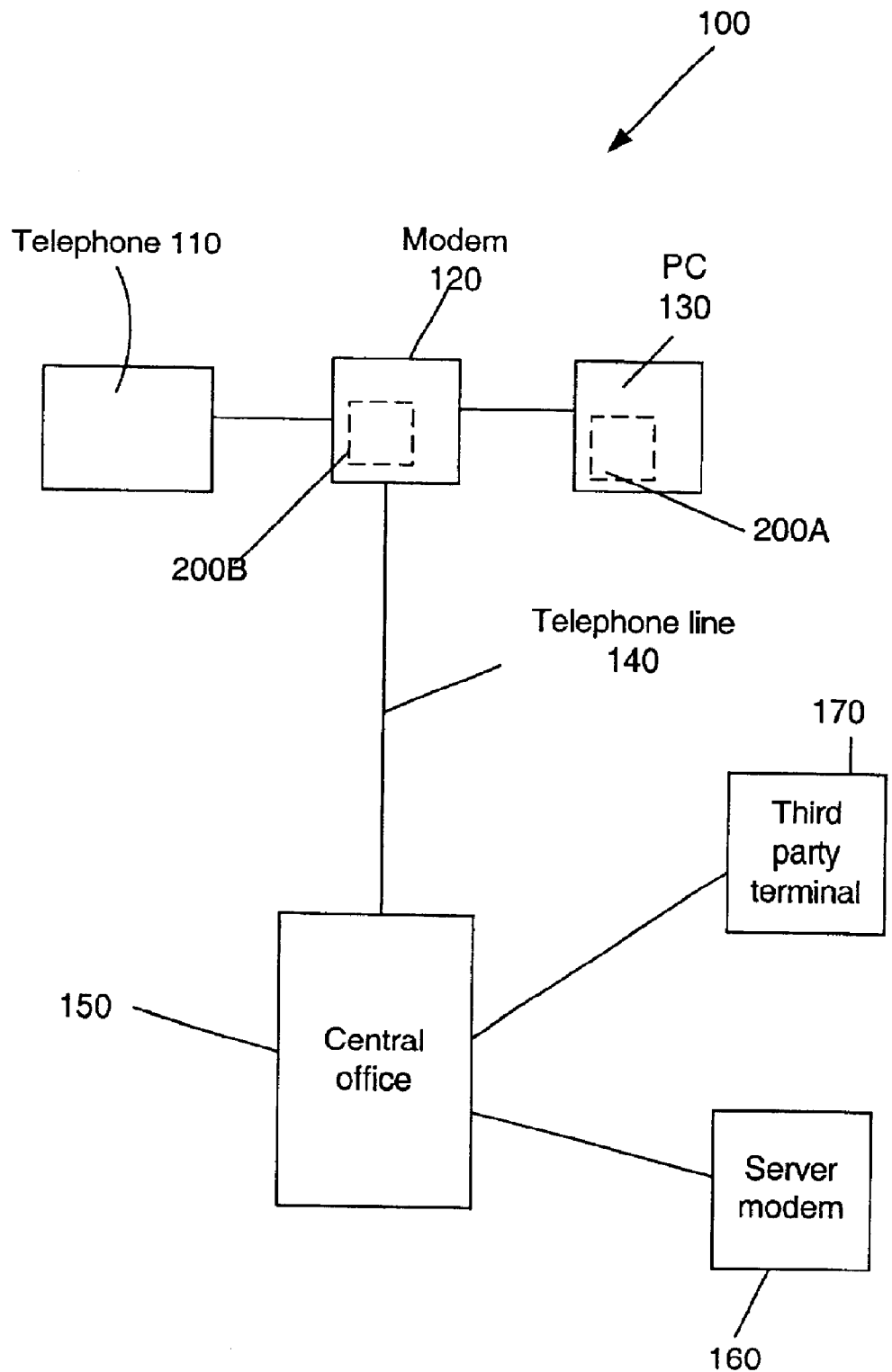
FIG. 1A depicts an example of a system in which an embodiment of the present invention can be used.

For example, FIG. 1A depicts an example system 100 in which an embodiment of the present invention can be used. System 100 may include a telephone 110, modem 120, personal computer ("PC") 130, central office 150, server modem 160, and third party terminal 170. Modem 120 may be capable of communicating with server modem 160 using V.90 and V.92. Modem 120 may be at least partially controlled using software executed by the modem's digital signal processor or controlled by software executed by PC 130. Path reconnection system 200 can be implemented as software executed by a central processing unit (CPU) within the PC 130 (depicted as 200A) and/or digital signal processor utilizing a memory storage device provided within modem 120 (depicted as 200B). Path reconnection system 200 can be implemented as firmware and/or hardware.

The modem 120 may communicate with the server modem 160 using for example, a twisted pair telephone line 140. Central office 150 establishes a circuit connection between the telephone line 140 and server modem 160 or between telephone line 140 and a third party terminal 170. Third party terminal 170 may be a computer, a fax machine, or a telephone. Similarly, modem 120 provides a connection between telephone line 140 and either telephone 110 or PC 130.

Figure 1B:
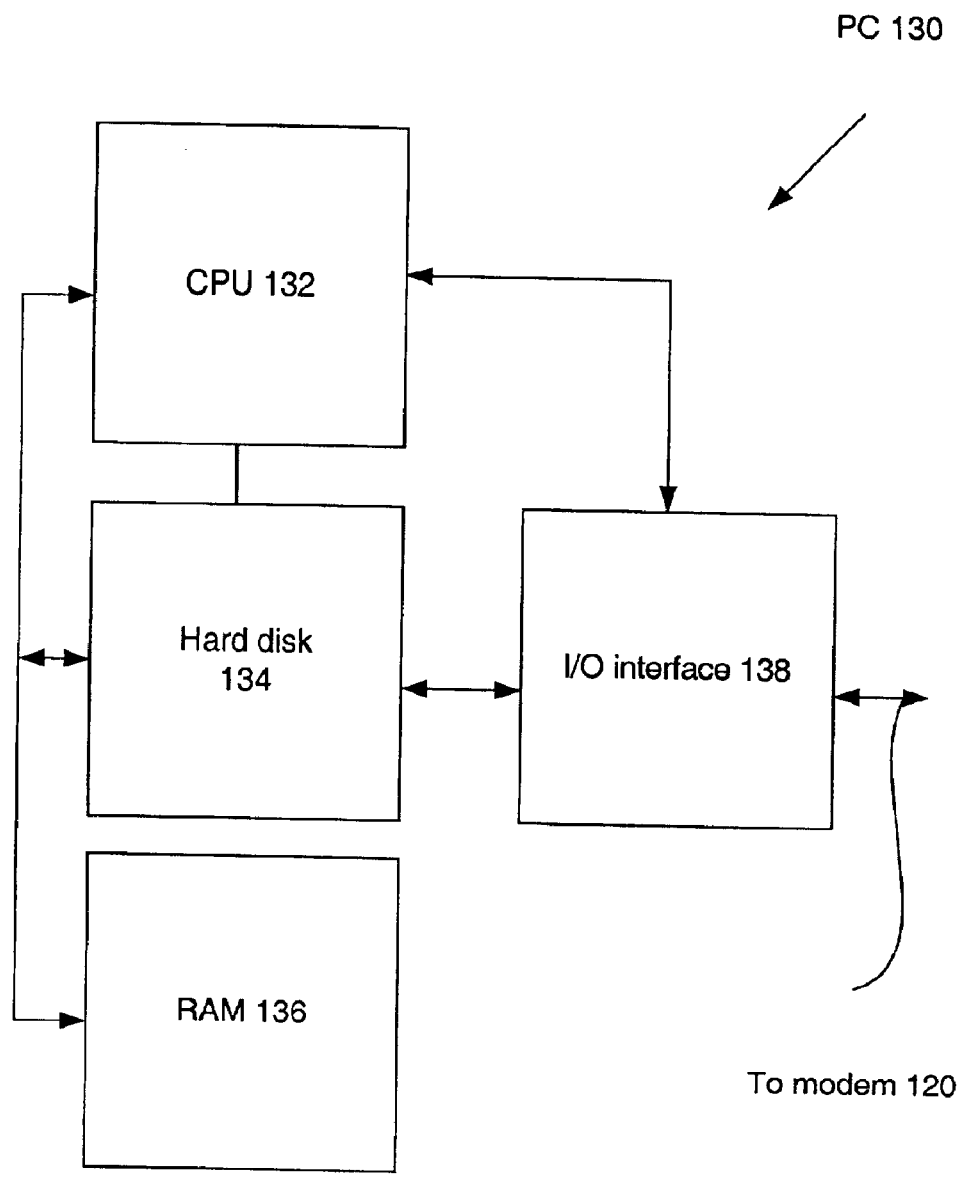
FIG. 1B depicts an example of a personal computer in which an embodiment of the present invention can be used.

As shown in FIG. 1B, the PC 130 may include a central processing unit ("CPU") 132, a hard disk memory 134, random access memory ("RAM") 136 and input/output ("I/O") interface 138. The interface 138 may be coupled to the modem 120 using a cable or bus either compliant, for example, with Peripheral Component Interconnect (PCI), Universal Serial Bus (USB), Ethernet (IEEE 802.3), and/or IEEE 1394.

Figure 2:
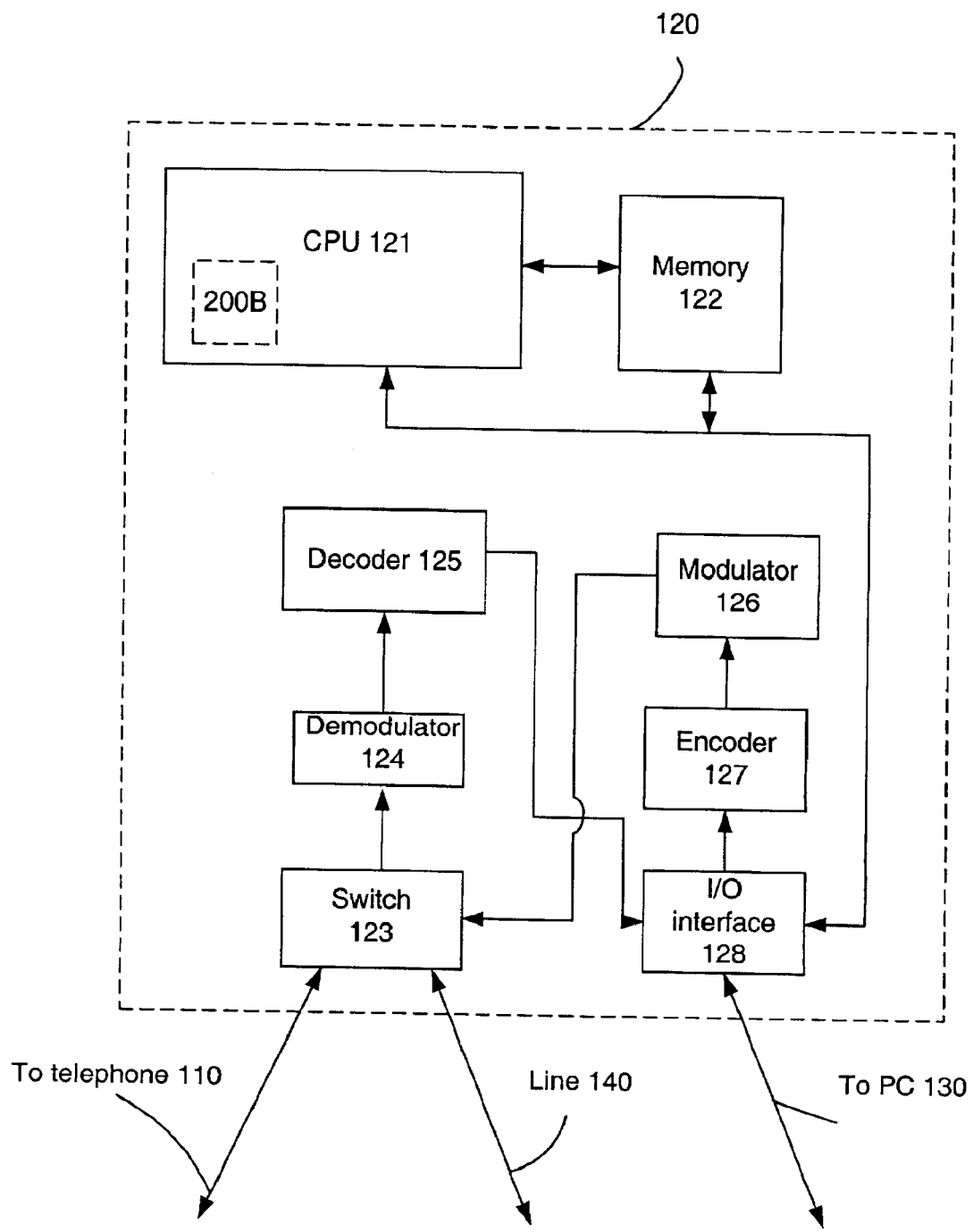
FIG. 2 depicts in block diagram form an example of a modem in which a path reconnection system can be used.

FIG. 2 depicts in block diagram form an example of a modem 120 that can use path reconnection system 200B. Modem 120 can include a CPU 121, memory 122, switch 123, demodulator 124, decoder 125, modulator 126, encoder 127, and I/O interface 128. Switch 123 can provide an interface between line 140 and an external device that can use line 140 (such as telephone 110). Switch 123 can also manage receipt and transmission of signals using line 140. Demodulator 124 and decoder 125 together could respectively provide demodulation and decoding of signals received from line 140 in accordance for example with ITU V.90. I/O interface 128 can manage receipt and transmission of signals between modem 120 and PC 130. Encoder 127 and modulator 126 can together respectively provide encoding and modulation of signals to be transmitted over line 140 in accordance for example with V.90. Demodulator 124, decoder 125, modulator 126, and encoder 127 can be implemented as firmware and/or hardware. Demodulator 124, decoder 125, modulator 126, and encoder 127 can be implemented as software stored by memory 122 executed by CPU 121.

Figure 3:
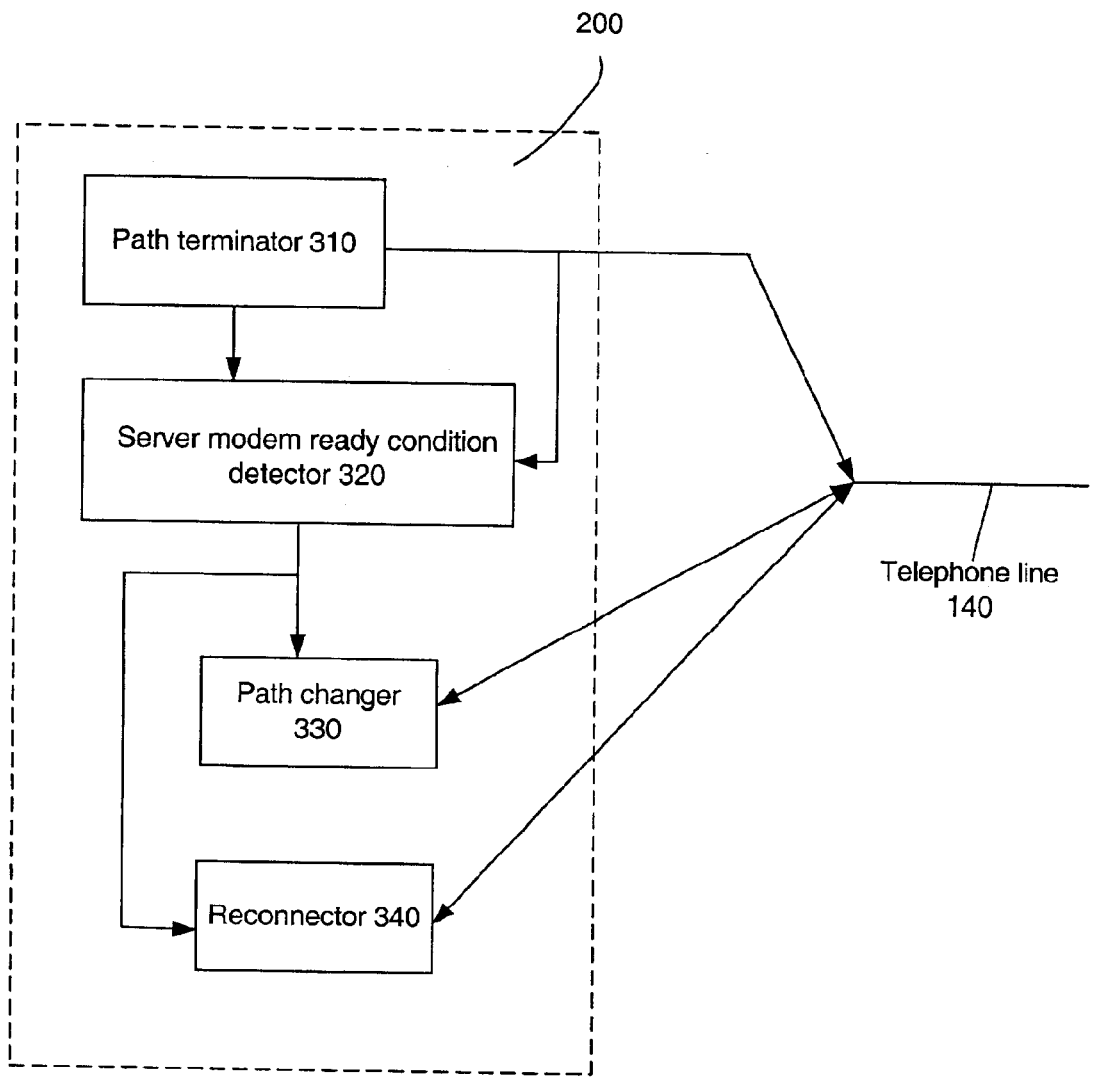
FIG. 3 depicts in block diagram form an implementation of a path reconnection system, in accordance with an embodiment of the present invention.

FIG. 3 depicts in block diagram form an example implementation of path reconnection system 200 in accordance with an embodiment of the present invention. Path reconnection system 200 can include path terminator 310, server modem ready condition detector 320, path changer 330, and reconnector 340. Path terminator 310, server modem ready condition detector 320, path changer 330, and reconnector 340 may be coupled to communicate with server modem 160 using line 140.

One advantage of path reconnection system 200 is that a reconnection between modem 120 and server modem 160 can be accomplished despite irregularities in the operation of central office 150. For example, following termination of the use of a second path (e.g., a connection between telephone 110 and a third party terminal 170), equipment used at central office 150 provided by different manufacturers may perform different actions. Central office equipment from some manufacturers may manually switch the path to establish a connection between server modem 160 and modem 120 whereas other central office equipment may not. Accordingly, if the central office equipment does not switch the path to establish a connection between server modem 160 and modem 120, then the availability of server modem 160 to reconnect with modem 120 may become lost and the user would need to dial back to connect with the server modem 160.

Figure 4:
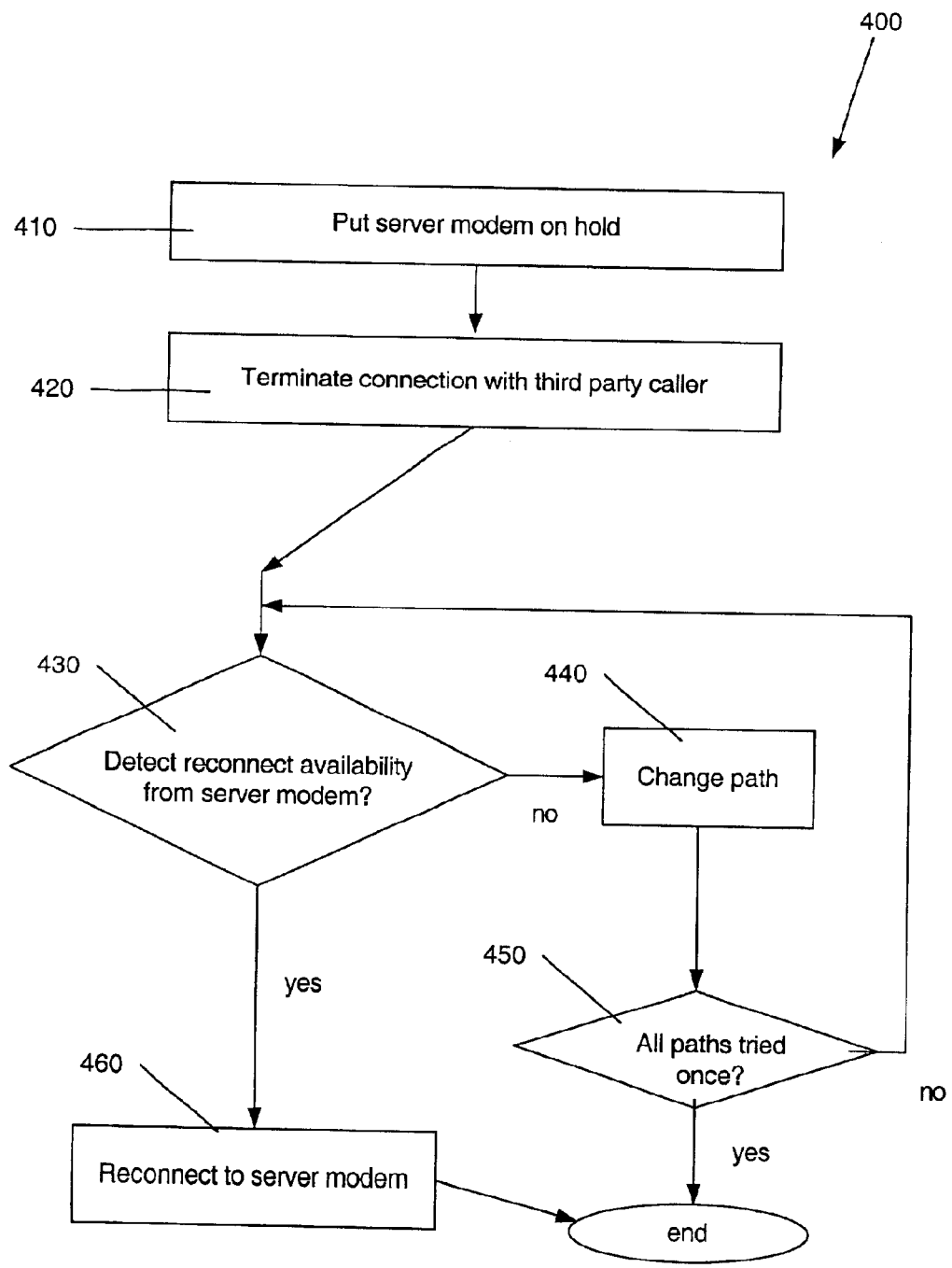
FIG. 4 depicts a flow diagram illustrating an example of a process, in accordance with an embodiment of the present invention.

In accordance with an embodiment of the present invention, FIG. 4 depicts a flow diagram illustrating an example operation of one embodiment of the present invention in process 400. Path reconnection system 200 may perform process 400. In action 410, the server modem 160, which has a connection with modem 120, goes on hold. Action 410 can be in response to a user of PC 130 desiring to initiate/accept a call using telephone 110 to/from a third party terminal 170. In one embodiment, modem 120 and server modem 160 negotiate the duration of the "modem on hold" period of the server modem. Action 420 may follow action 410.

In action 420, the second communications path between the telephone 110 and the third party terminal 170 terminates. For example, action 420 may occur when a user and the third party caller end their phone call. After termination of the call, modem 120 switches the use of line 140 to modem 120 from use by telephone 110. Path terminator 310 (FIG. 3) can administer action 420 by for example requesting the modem 120 to end the call by issuing a hook flash to the central office 150. Action 430 may follow actions 420.

In action 430, the path reconnection system 200 monitors for a server reconnect signal over line 140 from the server modem 160. The server reconnect signal indicates that the server modem 160 is available to reconnect with modem 120. For example, in V.92, the server modem 160 transmits the ANSam signal to indicate the server modem 160 is available to reconnect with modem 120. If the path reconnection system 200 detects a signal indicating that the server modem 160 is ready to reconnect, action 460 may follow. If the path reconnection system 200 does not detect a signal indicating that the server modem 160 is ready to reconnect, action 440 may follow. Server modem ready condition detector 320 (FIG. 3) may perform action 430.

In action 440, the path reconnection system 200 issues a command to the central office 150 to provide another communication path. For example, following termination of the path between the telephone 110 and third party terminal 170, if central office 150 provides a connection of the third party terminal 170 to line 140, then the central office 150 switches connections to establish a path between modem 120 and server modem 160. Or, for example, if the server modem 160 is connected to line 140, then central office 150 switches the connection to establish a path between modem 120 and third party terminal 170. Path changer 330 (FIG. 3) may perform action 440. Action 450 may follow actions 440.

In action 450, the path reconnection system 200 determines whether action 440 was performed enough times so that all communication paths between modem 120 and other devices have been tried at least once. If the action 440 was performed enough times so that all communication paths have been tried at least once then the process 400 may end and no communication path is reestablished between modem 120 and server modem 160. If action 440 was not performed enough times so that all communication paths have been tried at least once then action 430 may follow. For example, for two communication paths that are currently offered by most central offices (i.e., the original call path and the call waiting path), action 440 is performed once. Path changer 330 (FIG. 3) may perform action 450.

Advantageously, in actions 440 and 450, regardless of the inconsistency among central office communications equipment described earlier, path reconnection system 200 will search for the availability of server modem 160 among different possible paths.

In action 460, the path reconnection system 200 acknowledges the availability of the server modem 160 to reconnect with modem 120. In one example implementation, the modem 120 and server modem 160 may negotiate a reconnection using techniques described in V.92. Reconnector 340 (FIG. 3) may perform action 460.

Equipment of some central offices will ring telephone line 140 if modem 120 is on-hook, server modem 160 is on-hold, and the phone call between telephone 110 and third party terminal 170 ends with both sides hanging-up. The central office may try to reestablish the path between the modem 120 and server modem 160 by calling the user. In accordance with an embodiment of the present invention, the likelihood of reestablishing the original path between modem 120 and server modem 160 could be greatly increased if modem 120 answers the call, detects ANSam from the server modem 160, and assumes the role of the calling modem in this configuration. The user could also be given the option of dropping the server modem 160 immediately to stop the phone from continually ringing.

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims. For example, the embodiments described herein can be used for any modems that allow the user to put a server modem path communication on hold to take a call from a third party caller.

What is claimed is:

1. A method comprising:
   switching from a first communications path between a first modem and a second modem to a second communications path;
   terminating use of the second communications path; and
   requesting to switch to a different communications path until a detecting an indication that an active communication path is available to provide communication between the first and second modems.

2. The method of claim 1, wherein the indication comprises an ANSam signal.

3. The method of claim 1, wherein the requesting comprises requesting a central office equipment to switch from its present path to another communications path.

4. The method of claim 1, wherein the second communications path includes a telephone and a third party terminal.

5. The method of claim 1, further comprising establishing a reconnection between the first modem and the second modem on the path over which the indication is detected.

6. The method of claim 5, wherein the establishing a reconnection is in compliance with ITU-T V.92.

7. The method of claim 1, wherein the second modem comprises a server modem.

8. An apparatus comprising:
   a path terminator to terminate a first communications path;
   a second modem ready condition detector to monitor for an indication on a path that a second modem is available to reconnect with a first modem and further to communicate the availability of the path; and responsive to the communication of the availability of the path from the second modem ready condition detector, a path changer to request to change to a different path until the path changer receives the communication of availability of the path to provide communication between the first modem and the second modem.

9. The apparatus of claim 8 further comprising:

responsive to the communication from the second modem ready condition detector, a reconnector to establish a path connection between the first modem and the second modem using the path on which the availability is communicated from the second modem ready condition detector.

10. The apparatus of claim 9, wherein the reconnector complies with uses ITU-T V.92 to establish the path connection.

11. The apparatus of claim 8, wherein the path changer is to request a central office equipment to switch paths.

12. The apparatus of claim 8, wherein the indication comprises an ANSam signal.

13. The apparatus of claim 8, wherein the first communications path includes a telephone and a third party terminal.

14. The apparatus of claim 8, wherein the second modem comprises a server modem.

15. An article comprising a machine readable storage medium to store instructions, that when executed, instruct a machine to:

switch from a first communications path between a first modem and a second modem to a second communications path;

request termination of use of the second communications path;

request to switch to a different communications path until detecting an indication that an active communication path is available to provide communication between the first and second modems.

16. The article of claim 15, wherein the indication comprises an ANSam signal.

17. The article of claim 15, wherein the instruction to request to switch includes an instruction to request a central office equipment to switch from its present path to another communications path.

18. The article of claim 15, wherein the second communications path includes a telephone and a third party terminal.

19. The article of claim 15, further comprising an instruction to establish a reconnection between the first modem and the second modem using the communications path in which the indication is detected.

20. The article of claim 19, wherein the instruction to establish a reconnection complies with ITU-T V.92.

21. The article of claim 15, wherein the second modem comprises a server modem.

22. A system comprising:

a central processing unit;

a storage to store instructions that, if executed, enable the central processing unit to:

switch from a first communications path between a first modem and a second modem to a second communications path;

request termination of use of the second communications path;

request to switch to a different communications path until detecting an indication that an active communication path is available to provide communication between the first and second modems; and an interface to provide intercommunication at least between the central processing unit and the first modem.

23. The system of claim 22, wherein the indication comprises an ANSam signal.

24. The system of claim 22, wherein the interface complies with Peripheral Component Interconnect.

25. A system comprising:

a modem comprising a storage and central processing unit, wherein the storage is to store instructions that, if executed, enable the central processing unit to:

switch from a first communications path between the modem and a second modem to a second communications path;

request termination of use of the second communications path;

request to switch to a different communications path until detecting an indication that an active communication path is available to provide communication between the modem and the second modem a personal computer to receive and transmit information using the modem; and an interface to provide intercommunication at least between the personal computer and the modem.

26. The system of claim 25, wherein the indication comprises an ANSam signal.

27. The system of claim 25, wherein the interface complies with Peripheral Component Interconnect.

* * * * *